(12) United States Patent
Tallam et al.

(10) Patent No.: US 8,689,200 B1
(45) Date of Patent: Apr. 1, 2014

(54) METHOD AND SYSTEM FOR OPTIMIZING AN EXECUTABLE PROGRAM BY GENERATING SPECIAL OPERATIONS FOR IDENTICAL PROGRAM ENTITIES

(75) Inventors: Sriraman Tallam, Sunnyvale, CA (US); Ian Lance Taylor, Berkeley, CA (US); Cary Coutant, Saratoga, CA (US); Xinliang David Li, Palo Alto, CA (US); Christopher Demetriou, Redwood City, CA (US)

(73) Assignee: Google Inc., Mountain View, CA (US)

( * ) Notice: Subject to any disclaimer, the term of this patent is extended or adjusted under 35 U.S.C. 154(b) by 459 days.

(21) Appl. No.: 13/005,394

(22) Filed: Jan. 12, 2011

(51) Int. Cl.
*G06F 9/45* (2006.01)

(52) U.S. Cl.
USPC ............................ 717/159; 717/140; 717/151

(58) Field of Classification Search
None
See application file for complete search history.

(56) References Cited

U.S. PATENT DOCUMENTS

| | | | | |
|---|---|---|---|---|
| 4,755,966 A | * | 7/1988 | Lee et al. ....................... | 712/239 |
| 5,327,562 A | | 7/1994 | Adcock | |
| 5,524,244 A | * | 6/1996 | Robinson et al. ............. | 717/140 |
| 5,535,391 A | * | 7/1996 | Hejlsberg et al. ............. | 717/140 |
| 5,548,761 A | * | 8/1996 | Balasundaram et al. ...... | 717/159 |
| 5,632,034 A | * | 5/1997 | O'Farrell ....................... | 717/140 |
| 5,713,010 A | | 1/1998 | Buzbee et al. | |
| 5,799,302 A | | 8/1998 | Johnson et al. | |
| 5,819,074 A | * | 10/1998 | Mangelsdorf ................. | 717/151 |
| 5,828,886 A | * | 10/1998 | Hayashi ......................... | 717/159 |
| 5,854,935 A | * | 12/1998 | Enomoto ....................... | 717/159 |
| 5,892,940 A | * | 4/1999 | Mangelsdorf ................. | 717/151 |
| 5,896,521 A | * | 4/1999 | Shackleford et al. ......... | 717/151 |
| 5,905,893 A | * | 5/1999 | Worrell ......................... | 717/151 |
| 5,920,721 A | * | 7/1999 | Hunter et al. ................. | 717/159 |
| 6,041,180 A | * | 3/2000 | Perks et al. ................... | 717/151 |
| 6,128,627 A | * | 10/2000 | Mattis et al. .................. | 1/1 |
| 6,374,235 B1 | | 4/2002 | Chen et al. | |
| 6,718,546 B1 | * | 4/2004 | Johnson ........................ | 717/169 |
| 7,069,555 B1 | * | 6/2006 | Tzen ............................. | 718/102 |
| 7,207,038 B2 | * | 4/2007 | Bicsak et al. ................. | 717/159 |
| 7,392,513 B2 | * | 6/2008 | Long et al. .................... | 717/155 |
| 7,467,376 B2 | * | 12/2008 | Le Metayer et al. .......... | 717/143 |

(Continued)

OTHER PUBLICATIONS

Ilfak Guilfanov, "IDA and obfuscated code", Hex-Rays, 1998, <www.hex-rays.com/products/ida/support/ppt/caro_obfuscation.ppt>, pp. 1-44.*

(Continued)

*Primary Examiner* — Thuy Dao
*Assistant Examiner* — Samuel Hayim
(74) *Attorney, Agent, or Firm* — Morgan, Lewis & Bockius LLP

(57) ABSTRACT

A system and method for optimizing the object codes of a computer program is disclosed. The method includes receiving one or more object code units associated with an executable program; identifying, among the object code units, a first program entity and a first set of operations associated with the first program entity and a second program entity and a second set of operations associated with the second program entity, each program entity having an object code segment and an associated address; updating the object code units by inserting a predefined instruction before the first program entity's object code segment and causing the second set of operations to be associated with the predefined instruction if the first program entity's object code segment is identical to the second program entity's object code segment; and combining the updated object code units into the executable program.

18 Claims, 6 Drawing Sheets

(56) References Cited

U.S. PATENT DOCUMENTS

| | | | |
|---|---|---|---|
| 7,607,123 B2 | 10/2009 | Chavan | |
| 7,694,300 B2* | 4/2010 | Hunt et al. | 718/100 |
| 7,836,282 B2* | 11/2010 | Ban et al. | 712/226 |
| 7,840,776 B1* | 11/2010 | Kelly et al. | 711/207 |
| 8,321,834 B2 | 11/2012 | Baker et al. | |
| 2002/0013938 A1* | 1/2002 | Duesterwald et al. | 717/9 |
| 2003/0101431 A1* | 5/2003 | Duesterwald et al. | 717/111 |
| 2004/0221282 A1* | 11/2004 | Le Metayer et al. | 717/159 |
| 2005/0210208 A1* | 9/2005 | Long et al. | 711/159 |
| 2006/0064676 A1 | 3/2006 | Chavan | |
| 2007/0006185 A1* | 1/2007 | Choi et al. | 717/137 |
| 2008/0320246 A1* | 12/2008 | Fuhler et al. | 711/154 |
| 2009/0138847 A1* | 5/2009 | Beckwith et al. | 717/108 |
| 2009/0164757 A1* | 6/2009 | Ban et al. | 712/213 |
| 2009/0172638 A1* | 7/2009 | Cobb | 717/116 |
| 2009/0241098 A1 | 9/2009 | Lobo et al. | |
| 2010/0017436 A1* | 1/2010 | Wolge | 707/103 R |
| 2010/0162220 A1* | 6/2010 | Cui et al. | 717/155 |
| 2011/0107068 A1* | 5/2011 | Mitran et al. | 712/225 |
| 2012/0030652 A1 | 2/2012 | Jelinek | |

OTHER PUBLICATIONS

Tuvi Etzion, "Folding, Tiling, and Multidimensional Coding", IEEE, 2009, <http://ieeexplore.ieee.org/stamp/stamp.jsp?tp=&arnumber=5351265>, pp. 1-5.*

Toshio Suganuma et al., "Design and Evaluation of Dynamic Optimizations for a Java Just-In-Time Compiler", ACM, 2005, <http://delivery.acm.org/10.1145/1080000/1075386/p732-suganuma.pdf>, pp. 1-54.*

Diwan, Using Types to Analyze and Optimize Object-Oriented Programs, UMass, 2001, 42 pgs.

DWARF Debugging information format version 3, Dec. 20, 2005, 267 pgs.

Tallam, Notice of Allowance, U.S. Appl. No. 13/005,375, Jan. 25, 2013, 9 pgs.

Zellweger, An interactive high-level debugger for control-flow optimized programs, Jan. 1983, 30 pgs.

* cited by examiner

METHOD AND SYSTEM FOR OPTIMIZING AN EXECUTABLE PROGRAM BY GENERATING SPECIAL OPERATIONS FOR IDENTICAL PROGRAM ENTITIES

TECHNICAL FIELD

The disclosed embodiments relate generally to program compilation and linking, and in particular, to a system and method for optimizing an executable program by merging identical program entities such as functions or read-only data members in the executable program.

BACKGROUND

Large binary programs (e.g., applications or shared libraries written in C++) often have many functions or read-only data members that are identical. Although the size of a binary program may be reduced by merging these identical functions or read-only data members into a single copy, this optimization could be risky because it may cause the binary program to behave incorrectly if the merged functions or read-only data members are involved in certain address-related operations (e.g., address-based comparison) during the execution of the binary program.

SUMMARY

In accordance with some embodiments described below, a method for optimizing the object code of a program using a computer is disclosed. The computer-implemented method includes: receiving one or more object code units associated with an executable program; identifying, among the one or more object code units, a first program entity and a first set of operations associated with the first program entity and a second program entity and a second set of operations associated with the second program entity, wherein each program entity has an object code segment and an associated address; updating the one or more object code units by causing the second set of operations to be associated with the first program entity if the first program entity's object code segment is identical to the second program entity's object code segment and no operation from the second set operates on the address of the second program entity; and combining the updated one or more object code units into the executable program.

In accordance with some embodiments described below, a system for optimizing an executable program includes one or more central processing units for executing programs; and memory to store data and to store one or more programs to be executed by the one or more central processing units. The one or more programs include instructions for: receiving one or more object code units associated with an executable program; identifying, among the one or more object code units, a first program entity and a first set of operations associated with the first program entity and a second program entity and a second set of operations associated with the second program entity, wherein each program entity has an object code segment and an associated address; updating the one or more object code units by causing the second set of operations to be associated with the first program entity if the first program entity's object code segment is identical to the second program entity's object code segment and no operation from the second set operates on the address of the second program entity; and combining the updated one or more object code units into the executable program.

In accordance with some embodiments described below, a computer readable-storage medium stores one or more programs for execution by one or more processors of a computer system. The one or more programs include instructions for: receiving one or more object code units associated with an executable program; identifying, among the one or more object code units, a first program entity and a first set of operations associated with the first program entity and a second program entity and a second set of operations associated with the second program entity, wherein each program entity has an object code segment and an associated address; updating the one or more object code units by causing the second set of operations to be associated with the first program entity if the first program entity's object code segment is identical to the second program entity's object code segment and no operation from the second set operates on the address of the second program entity; and combining the updated one or more object code units into the executable program.

In accordance with some embodiments described below, a method for optimizing the object code of a program using a computer is disclosed. The computer-implemented method includes: receiving one or more object code units associated with an executable program; identifying, among the one or more object code units, a first program entity and a first set of operations associated with the first program entity and a second program entity and a second set of operations associated with the second program entity, wherein each program entity has an object code segment and an associated address; updating the one or more object code units by inserting a predefined instruction before the first program entity's object code segment and causing the second set of operations to be associated with the predefined instruction if the first program entity's object code segment is identical to the second program entity's object code segment; and combining the updated one or more object code units into the executable program.

In accordance with some embodiments described below, a system for optimizing an executable program includes one or more central processing units for executing programs; and memory to store data and to store one or more programs to be executed by the one or more central processing units. The one or more programs include instructions for: receiving one or more object code units associated with an executable program; identifying, among the one or more object code units, a first program entity and a first set of operations associated with the first program entity and a second program entity and a second set of operations associated with the second program entity, wherein each program entity has an object code segment and an associated address; updating the one or more object code units by inserting a predefined instruction before the first program entity's object code segment and causing the second set of operations to be associated with the predefined instruction if the first program entity's object code segment is identical to the second program entity's object code segment; and combining the updated one or more object code units into the executable program.

In accordance with some embodiments described below, a computer readable-storage medium stores one or more programs for execution by one or more processors of a computer system. The one or more programs include instructions for: receiving one or more object code units associated with an executable program; identifying, among the one or more object code units, a first program entity and a first set of operations associated with the first program entity and a second program entity and a second set of operations associated with the second program entity, wherein each program entity has an object code segment and an associated address; updating the one or more object code units by inserting a predefined instruction before the first program entity's object code segment and causing the second set of operations to be associated with the predefined instruction if the first program entity's object code segment is identical to the second program entity's object code segment; and combining the updated one or more object code units into the executable program.

BRIEF DESCRIPTION OF DRAWINGS

The aforementioned embodiment of the invention as well as additional embodiments will be more clearly understood as a result of the following detailed description of the various aspects of the invention when taken in conjunction with the drawings. Like reference numerals refer to corresponding parts throughout the several views of the drawings.

DESCRIPTION OF EMBODIMENTS

Reference will now be made in detail to embodiments, examples of which are illustrated in the accompanying drawings. While the invention will be described in conjunction with the embodiments, it will be understood that the invention is not limited to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Figure 1A:
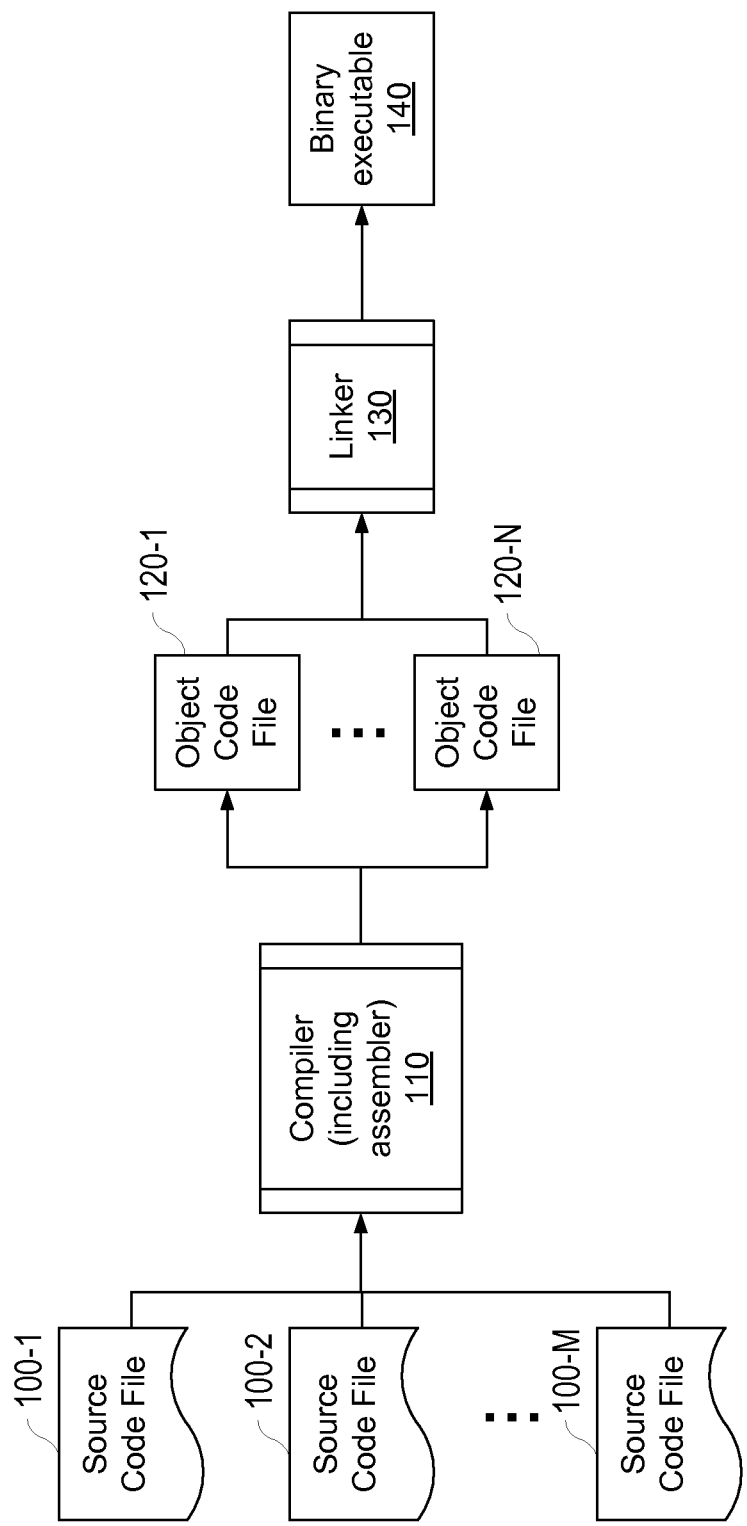
FIG. 1A is an overview block diagram of a process for transforming source codes of a program into an executable program in accordance with some embodiments.

FIG. 1A is an overview block diagram of a process for transforming the source code of a program into an executable program in accordance with some embodiments. In some embodiments, the program's source code is stored within one or more source code files 100-1 to 100-M. A compiler 110 transforms the source code files into one or more object code files 120-1 to 120-N. Depending on the size of the executable program, the number of object code files ranges from a few to hundreds or even thousands. In some embodiments, the compiler 110 may include other components such as an assembler. The process of compiling a program from a human-readable format such as source code into the binary format that a processor executes involves successively transforming the source code into simpler forms and discarding redundant information at each step until the result is a sequence of simple operations, register names, memory addresses, and binary values that the processor can understand. During this process, instructions within one source code file may be distributed over multiple object code files and instructions within multiple source code files may be merged into a single object code file. The linker 130 is a program that combines the one or more object files 120-1 to 120-N generated by the compiler 110 into a single binary executable program 140, which can be executed on a specific computer platform.

As noted above, an executable program may be generated by combining a large number of object code files. Many of these object code files may have identical code segments such as identical functions or read-only data members. Note that although identical source code segments may result in an identical object code segment, different source code segments may still be associated with an identical object code segment if the source code differences are "ignored" by the compiler 110.

Figure 1B:
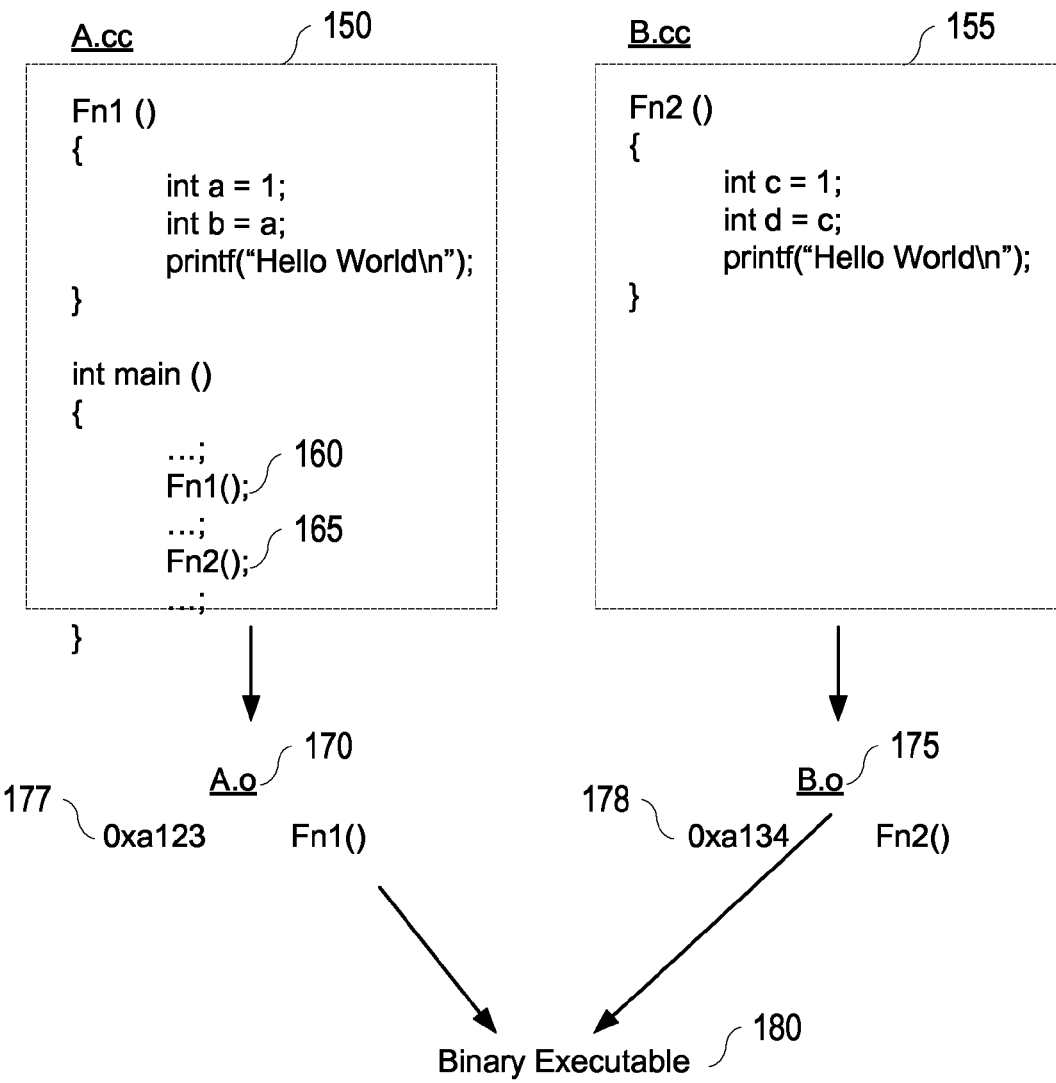
FIGS. 1B and 1C illustrate an example of merging identical functions in an executable program in accordance with some embodiments.

FIG. 1B illustrates an exemplary program that has two source code files, "A.cc" 150 and "B.cc" 155. In particular, the source code file 150 includes a definition of a function Fn1( ) and the source code file 155 includes a definition of another function Fn2( ). Although the two functions are not identical at the source code level, their object code counterparts are identical. Besides the function Fn1( ) the source code file 150 includes a main( )function that has at least two function calls, one call of Fn1( ) 160 and another call of Fn2( ) 165.

As shown in FIG. 1B, each of the two source code files 150 and 155 is compiled into a separate object code file "A.o" 170 or "B.o" 175. In some embodiments, the compiler 110 assumes that every function in a source code file is different from another function in the same source code file or another source file and therefore assigns a unique address to each function in the object code. In this example, it is assumed that the address of the function Fn1( ) in the object code file 170 is 0xa123 and the address of the function Fn2( ) in the object code file 175 is 0xa134. The binary executable 180 generated by the linker 130 in accordance with the two object code files (along with other object code files if any) will have two copies of identical binary functions, one for the function Fn1( ) and the other one for the function Fn2( ).

Figure 1C:
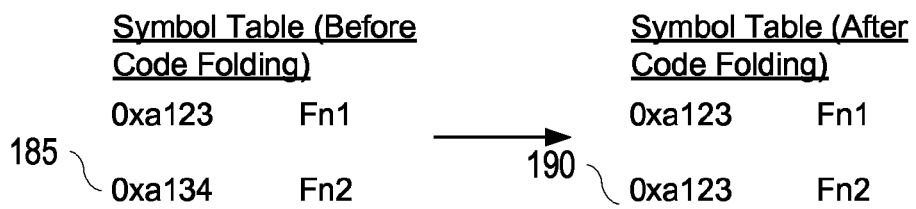

FIG. 1C illustrates an example of merging identical functions in an executable program in accordance with some embodiments. In some embodiments, the process of merging identical functions into a single copy is referred to as "code folding." As shown in FIG. 1C, the symbol table before the code folding has two entries associated with the two symbols Fn1 and Fn2. These two symbols represent two different functions in the source code and are associated with two different addresses 0xa123 and 0xa134, each address corresponding to a respective function in the source code. Because the two functions are identical at the object code level, it is possible to update the symbol table by merging the two functions into one copy. In this example, it is assumed that the object code corresponding to the function Fn1( ) is kept and the object code corresponding to the function Fn2( ) is eliminated such that the address associated with the symbol Fn2 in the symbol table changes from "0xa134" 185 to "0xa123" 190. Note that there are many well-known methods of determining whether two functions are identical to each other at the object code level. A more detailed description of such methods is provided below in connection with FIG. 3B.

One of the assumptions underlying the code folding examples illustrated above is that the program does not have an operation that manipulates the original address 0xa134 of the function Fn2. For example, if the program has the following operations (which are expressed in pseudo code):

```
if (Fn1==Fn2)
{
   set flag 1;
}
else
{
   set flag 2;
}
```
the outcome based on the symbol table before code folding (i.e., Fn1≠Fn2) will be different from the outcome based on the symbol table after code folding (i.e., Fn1=Fn2). In other words, if the linker 130 has a code optimization option of merging identical code segments, it should exercise this option carefully to avoid causing incorrect behavior by the optimized program. It is worth noting that the process of merging identical read-only data members is similar to the process of merging identical functions. For illustration, the following description focuses on the process of merging identical functions.

Figure 2:
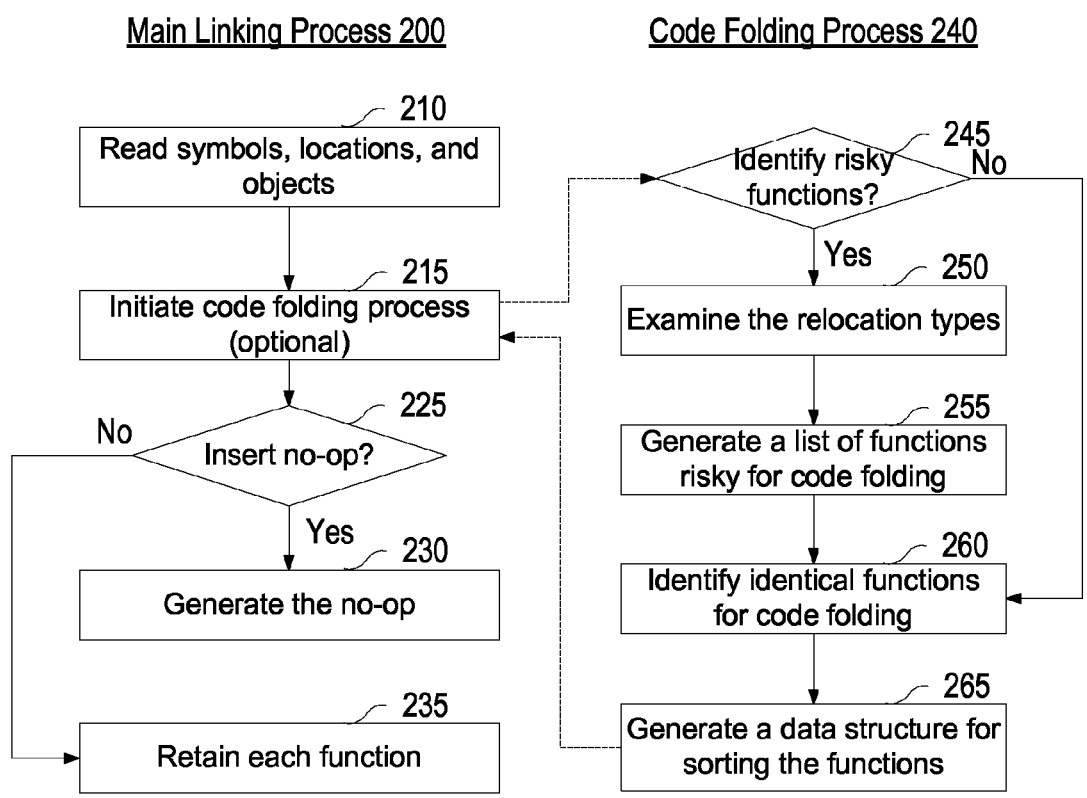
FIG. 2 is a flow chart of a process for merging identical functions in connection with a linking progress in accordance with some embodiments.

FIG. 2 is a flow chart of a process for merging identical functions in connection with a linking progress in accordance with some embodiments. As will be explained below, this process sums up at least four different embodiments of performing code folding, each embodiment providing a unique aspects for merging identical functions. In some embodiments, the code folding process 240 is an auxiliary process associated with the main linking process 200. When the main linking process 200 chooses to optimize the object code by merging identical functions or read-only data members, the code folding process 240 is initiated, e.g., via a different thread. The main linking process 200 begins with reading (210) the symbols, relocations, and objects associated with an executable program. Note that a relocation data structure is a well-known entity used in the art of program compiling and linking. For each reference (or call) to a function or its corresponding address in the executable program, the compiler 110 generates a relocation entry at the compilation time and stores the relocation entry within a data structure as part of the object code. In some embodiments, a relocation entry has an attribute that can be used to determine whether a reference is associated with a function or its address.

Figure 3A:
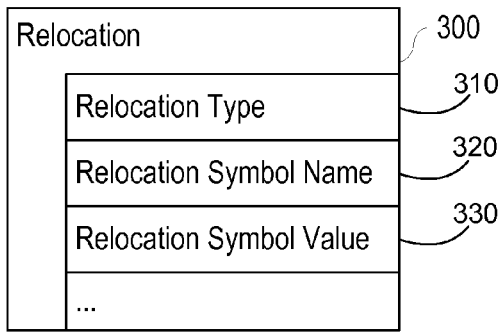
FIG. 3A is a block diagram of a relocation data structure in accordance with some embodiments.

FIG. 3A is a block diagram of a relocation data structure in accordance with some embodiments. The relocation data structure 300 includes multiple attributes for generating the executables by the linker 130 such as relocation type 310, relocation symbol name 320, and relocation symbol value 330. In some embodiments, the relocation type 310 is an attribute that depends on: (i) the architecture of the target processor for which the executable is generated, (ii) the type of machine instruction code constituting the executable, and (iii) whether the relocation is associated with a reference to a function or a reference to a function address. The relocation types 310 are commonly represented using standard names or designations, some examples of which are shown in the table below. This table shows the relocation type names associated with combinations of different executable object types (e.g., position-independent executable (PIE) objects and position-independent code (PIC) objects) and different relocation reference types, all for target processors that are compatible with an i386 instruction set architecture. Note that one skilled in the art would understand that the present invention is equally applicable to the relocation types of the other processor architectures that might have different naming standards.

For example, for target processors with an i386 instruction set architecture, there is a bifurcation between the relocation type 310 of a reference to a function and the relocation type of a reference to a function address for objects in the Executable and Linkable Format (ELF) as follows:

|  | Executable/Shared libraries built with position-independent executable (PIE) objects | Executable/Shared libraries built with position-independent code (PIC) objects | Executable/Shared libraries built with non-PIC and non-PIE objects |
| --- | --- | --- | --- |
| Function reference relocation type | R_386_PC32 | R_386_PLT32 | R_386_PC32 |
| Function address reference relocation type | R_386_GOTOFF | R_386_GOT32 | R_386_32 |

In some embodiments, this property can be used to identify those operations on a function's address that may cause unsafe behavior if the function were merged with another identical function. Note that the use of relocation type as an indicator or proxy to determine whether two identical functions can be merged is merely one embodiment of the present application. One skilled in the art would understand that another property found in the object code may be used for similar purpose as long as the property demonstrates differences between a reference to a function and a reference to a function address. In some embodiments, such property may be derived from one or more attributes associated with the relocation or other information.

In some embodiments, the fact that a function is subject to an operation on its address (e.g., the function's relocation type is R_386_GOTOFF) only means that there is a potential risk of merging such function into another identical function but it does not necessarily guarantee that such merge would result in unsafe behavior. For example, if the operation does not compare the function's address with another function's address as illustrated above, it is still possible to merge the function with another identical one. In some embodiments, if only one of two identical functions has operations on its address while the other one does not, it is safe to merge the other one into the first one such that there is no operation on a substituting function address.

Returning to FIG. 2, in order to merge identical functions in the object code, the linker 130 initiates the code folding process 240 (215). In some embodiments, there are two code folding schemes for a linker to choose from. A first scheme involves identifying a "black list" of functions that have operations on their respective addresses, which are deemed "unsafe" for code folding, and prevent any function in the black list from code folding even if it is identical to another function. As will be explained below, this scheme is relatively easy implement with an update to the linker programs. A second scheme involves merging a source identical function (i.e., the function to be deleted from the executable program) with a target identical function (i.e., the function that remains in the executable program) by inserting a predefined instruction (e.g., a no-op instruction) before the target function and redirecting all the references to the source function or its address to the predefined instruction. Compared with the first scheme above, this second scheme can achieve a higher code reduction rate but requires more updates to existing linker programs. In some embodiments, the second scheme is further divided into two sub-schemes: (i) a first sub-scheme that involve inserting a predefined instruction regardless of whether the source identical function has any "unsafe" operation on the function's address; and (ii) a second sub-scheme that involves inserting a predefined instruction only if the source identical function is deemed to have an "unsafe" operation on the function's address. Note that both schemes above are illustrated by the flow chart shown in FIG. 2 with some of the steps (e.g., 250, 255) corresponding to one scheme (e.g., the "black list" scheme) and some of the steps (e.g., 230) corresponding to the other scheme (e.g., the "no-op" scheme).

At the beginning of the code folding process 240, the linker 130 determines whether or not it generates a black list of functions risky for code folding by, e.g., checking a function's associated relocation type (245). In some embodiments, as noted above, the relocation type's value may indicate whether the function has any "unsafe" operation on its address (e.g., address comparison). If the linker 130 chooses to generate a black list of potentially risky functions (245—yes), the linker 130 examines the relocation types associated with different functions in the object code (250). Because the linker 130 knows in advance the architecture of the target processor for which the executable is generated and the type of machine instruction code of the executable, it can conduct a table lookup to determine which function's relocation types represent potentially "unsafe" operations on the function's address and which function's relocation types represent "safe" operations from the perspective of code folding. Based on the identified relocation types, the linker 130 identifies a black list of functions that should not be folded (255). If the linker 130 chooses to the no-op scheme (245—no), which does not have a black list of functions, the steps 250 and 255 can be skipped.

In either case, the linker 130 identifies identical functions for code folding (260). In some embodiments, the linker 130 generates a checksum or the like for each function based on its content (e.g., the object code) and compares two functions' checksums to determine whether they are identical or not. For example, two functions that have the same checksum are deemed to be identical whereas two functions that do not have the same checksum are deemed to be different from each other. In some embodiments, the linker 130 performs the aforementioned checksum comparison to only those functions not identified in the black list such that all the identical functions are safe to be merged. If there is no black list, the linker 130 then applies the "no-op" approach to the identical functions identified at step 260.

Figure 3B:
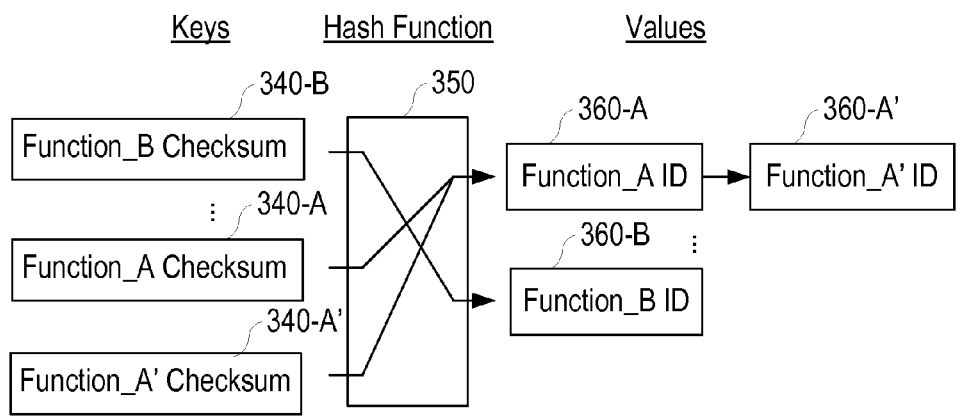
FIG. 3B is a block diagram of a hash data structure in accordance with some embodiments.

In some embodiments, the linker 130 uses a data structure (e.g., a hash table) for sorting the functions found in the object code (265). FIG. 3B depicts an exemplary hash table for this purpose in accordance with some embodiments. Note that each key (340-A, 340-B), which is a function's checksum, is mapped to a corresponding value (360-A, 360-B) by a hash function 350. In some embodiments, the hash function 350 is configured to map different functions having different checksums (e.g., 340-B and 340-A) to different values (e.g., 360-B and 360-A) and map different functions having the checksums (e.g., 340-A and 340-A') to the same value (e.g., 360-A) such that the two functions' IDs are stored in the same bucket (e.g., 360-A and 360-A'). By doing so, a unique function that does not have an identical counterpart always has a unique value in the hash table and identical functions automatically merge into one value in the hash table.

In some embodiments, the code folding operation is performed as part of the main linking process 200 after the generation of the hash table. To do so, the linker 130 needs to determine whether it should use the "black list" approach or the "no-op" approach (225). If the "black list" approach is adopted (225—no), the linker 130 then merges the identical functions in the hash table and automatically retains those identical functions in the black list (235) because the latter ones are either not present in the hash table or treated as unique ones. Note that the "black list" approach does not have to use the relocation type and it is possible for the linker 130 (or in some embodiments, the compiler 110) to analyze the object code to identify a black list of "unsafe" functions that may be more accurate than using the relocation type. If the compiler 110 is used for this purpose, it may store the black list of "unsafe" functions in a data structure shared with the linker 130. If the "no-op" approach is chosen (225—yes), the linker 130 will generate a no-op operation for each identical function found in the hash table as described above (230).

In some embodiments, the linker 130 may use a hybrid scheme of the "no-op" approach and the "black list" approach such that the number of "no-op" instructions generated varies depending on whether those identical, but "unsafe," functions have been distinguished from those identical, but "safe," functions in the hash table. In this hybrid approach, before merging identical functions, the linker 130 checks whether the functions are in the black list or not. If they are in the black list, the linker 130 will delete the source function from the executable program, generate a "no-op" instruction before the target function, and direct any function address related operation to the address of the "no-op" instruction. Otherwise, if two identical functions do not have any "unsafe" operation, the linker 130 may delete the source function from the executable program and direct any function address related operation to the address of the target function.

Figure 4A:
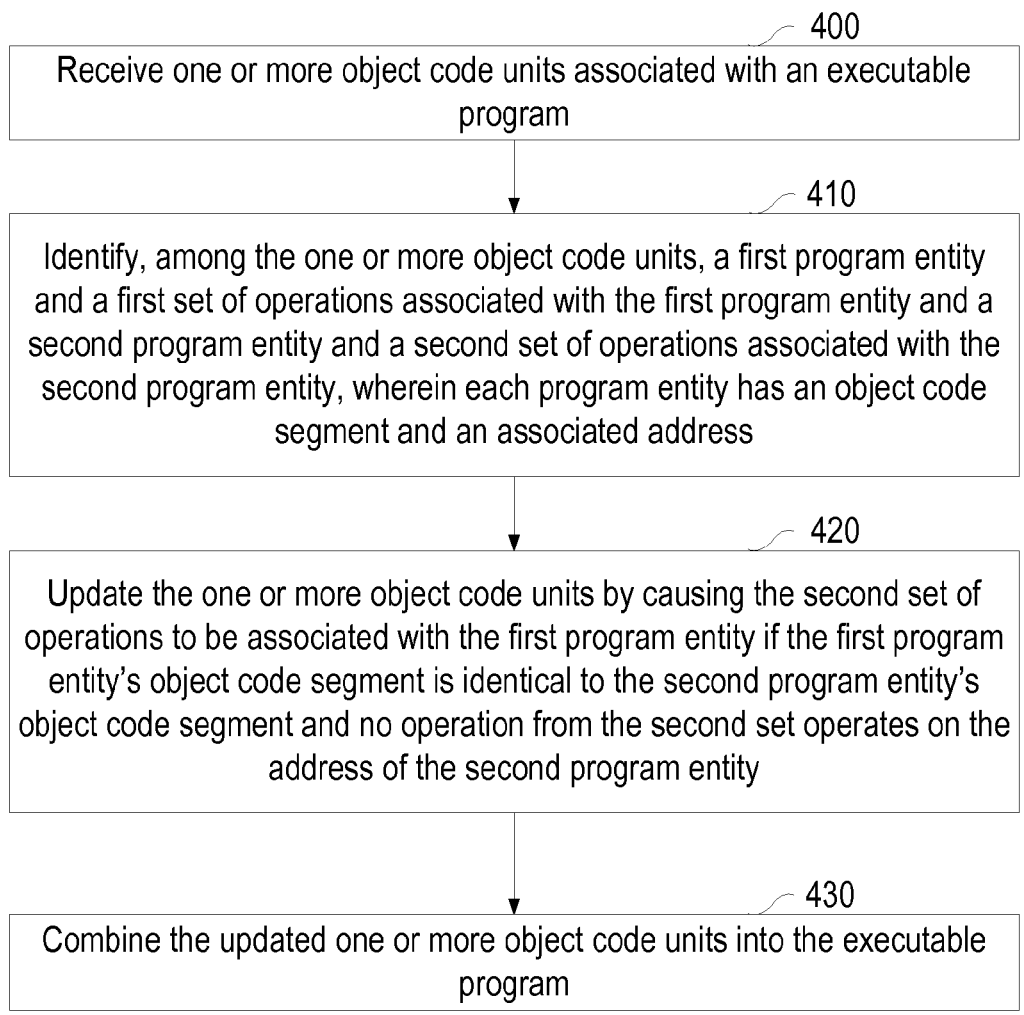
FIGS. 4A and 4B are flow charts of a process for optimizing an executable program in accordance with some embodiments.

FIG. 4A is a flow chart of a process for optimizing an executable program at a computer that has memory and one or more processors in accordance with some embodiments. The computer receives one or more object code units from the memory (400). In some embodiments, the one or more object code units are one or more object code files and the computer receives them in connection with executing a linker application.

The computer then identifies, among the one or more object code units, a first program entity and a first set of operations associated with the first program entity and a second program entity and a second set of operations associated with the second program entity (410), each program entity having an object code segment and an associated address. For example, a program entity may correspond to a function or a read-only data member. In some embodiments, the first and second program entities are identical if their object code segments are identical but have different addresses. In some embodiments, at least one operation from the first set operates on the address of the first program entity. This operation may be selected from the group consisting of an address comparison and an address modification that includes, e.g., increasing/decreasing the address or calculating another address using the address.

The computer updates the one or more object code units by causing the second set of operations to be associated with the first program entity if the first program entity's object code segment is identical to the second program entity's object code segment and no operation from the second set operates on the address of the second program entity (420) and combines the updated one or more object code units into an executable program (430).

In some embodiments, the computer updates the one or more object code units by generating a first checksum using the first program entity's object code segment and a second checksum using the second program entity's object code segment; and comparing the first checksum with the second checksum to determine whether the first program entity's object code segment is identical to the second program entity's object code segment. In some embodiments, the computer compares the first checksum with the second checksum by generating a <key, value> pair in a hash table for the first program entity, wherein the key is the first program entity's checksum and the value is the first program entity's address; querying the hash table for a value using the second checksum as a key; and determines that the two program entities' object code segments are identical if the queried value is the first program entity's address or different if the queried value is the second program entity's address.

In some embodiments, the computer updates the one or more object code units by, for a respective operation of the second set, identifying a property (e.g., a relocation type of the respective operation) associated with the respective operation; and comparing the identified property with a predefined value to determine whether the respective operation operates on the address of the second program entity. In some embodiments, the updating further includes deleting the second program entity's object code segment from the executable program.

Figure 4B:
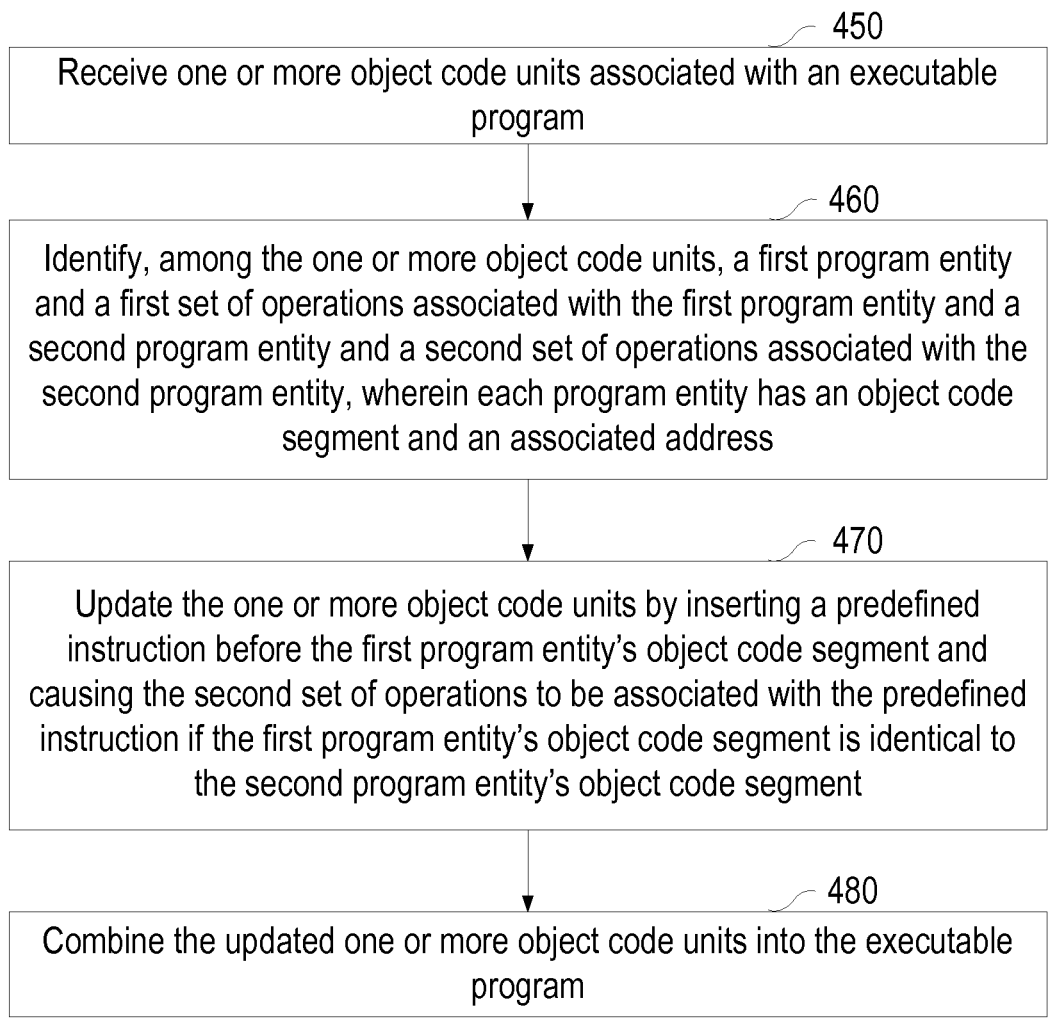

FIG. 4B is a flow chart of a process for optimizing an executable program at a computer that has memory and one or more processors in accordance with some embodiments. This process is similar to the process described above in connection with FIG. 4A except that the computer updates the one or more object code units by inserting a predefined instruction (e.g., a no-op instruction that has a different address from the first program entity's address) before the first program entity's object code segment and causing the second set of operations to be associated with the predefined instruction if the first program entity's object code segment is identical to the second program entity's object code segment.

In some embodiments, the second set includes at least one operation that operates on the address of the second program entity before the update of the one or more object code units and operates on the address of the predefined instruction after the update of the one or more object code units. In some other embodiments, the second set includes no operation that operates on the address of the second program entity.

In some embodiments, the computer updates the one or more object code units by generating a first checksum using the first program entity's object code segment and a second checksum using the second program entity's object code segment; and comparing the first checksum with the second checksum to determine whether the first program entity's object code segment is identical to the second program entity's object code segment. In some embodiments, the computer compares the first checksum with the second checksum by generating a <key, value> pair in a hash table for the first program entity, wherein the key is the first program entity's checksum and the value is the first program entity's address; querying the hash table for a value using the second checksum as a key; and determines that the two program entities' object code segments are identical if the queried value is the first program entity's address or different if the queried value is the second program entity's address.

In some embodiments, the computer updates the one or more object code units by, for a respective operation of the second set, identifying a property (e.g., a relocation type of the respective operation) associated with the respective operation; and comparing the identified property with a predefined value to determine whether the respective operation operates on the address of the second program entity. In some embodiments, the updating further includes deleting the second program entity's object code segment from the executable program.

Figure 5:
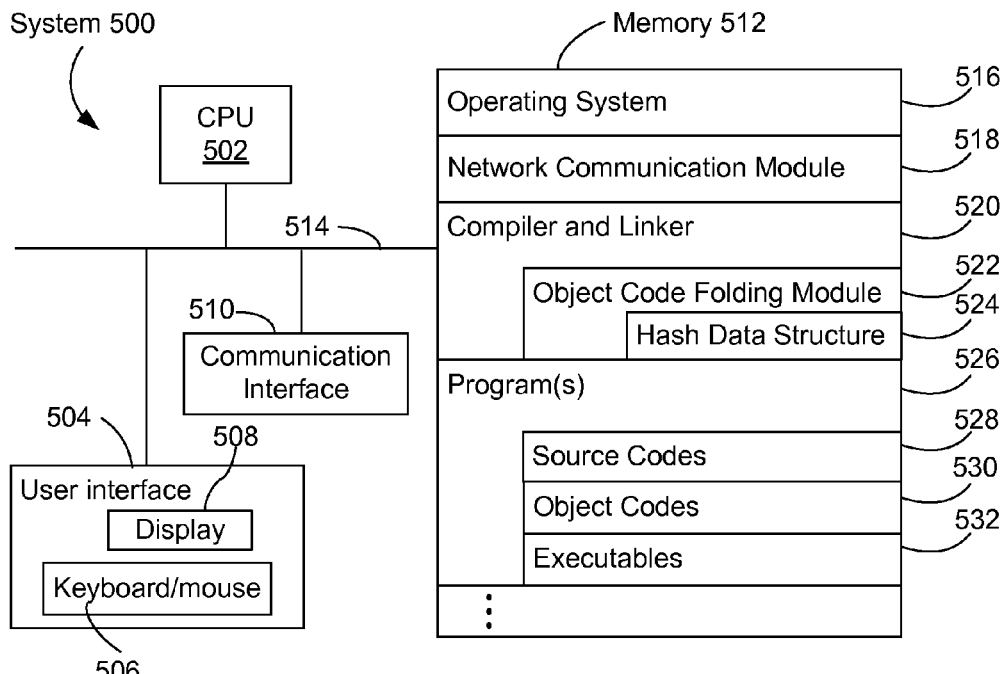
FIG. 5 is a block diagram of a system for code optimization in accordance with some embodiments.

Referring to FIG. 5, an embodiment of a computer system 500 that implements the methods described above includes one or more processing units (CPU's) 502, one or more network or other communications interfaces 510, memory 512, and one or more communication buses 514 for interconnecting these components. In some embodiments, fewer and/or additional components, modules or functions are included in the computer system 500. The communication buses 514 may include circuitry (sometimes called a chipset) that interconnects and controls communications between system components. The computer system 500 may optionally include a user interface 504. In some embodiments, the user interface 504 includes a display device 508 and/or a keyboard 506, but other configurations of user interface devices may be used as well. Memory 512 may include high speed random access memory and may also include non-volatile memory, such as one or more magnetic or optical storage disks, flash memory devices, or other non-volatile solid state storage devices. The high speed random access memory may include memory devices such as DRAM, SRAM, DDR RAM or other random access solid state memory devices. Memory 512 may optionally include mass storage that is remotely located from CPU's 502. Memory 512, or alternately the non-volatile memory device(s) within memory 512, comprises a computer readable storage medium. Memory 512 stores the following elements, or a subset of these elements, and may also include additional elements:

- an operating system 516 that includes procedures for handling various system services and for performing hardware dependent tasks;
- a network communication module (or instructions) 518 that is used for connecting the computer system 500 to other computers via the one or more communications network interfaces 510 and one or more communications networks, such as the Internet, other wide area networks, local area networks, metropolitan area networks, and so on;
- a compiler and linker application 520 for processing the source code of a program written in a particular language such as C, C++, Java, etc. and generating the binary executable;
- an object code folding module 522 for identifying identical program entities including functions and read-only data members in the object code and applying a code folding scheme to the identical program entities;
- a hash table data structure 524 for storing information identifying program entities subject to code folding; and
- one or more programs 526, each program further including source code 528, object code 530, and executables 532.

Although some of the various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
at a computer having memory and one or more processors:
receiving one or more object code units associated with an executable program;
identifying, among the one or more object code units, a first program entity and a first set of operations associated with the first program entity and a second program entity and a second set of operations associated with the second program entity, wherein each program entity has an object code segment and an address of the object code segment and the first set of operations includes at least one reference to the address of the first program entity's object code segment and the second set of operations includes at least one reference to the address of the second program entity's object code segment;
when the first program entity's object code segment is identical to the second program entity's object code segment, updating the one or more object code units by generating and inserting a no-operation instruction in an address before the address of the first program entity's object code segment and causing the second set of operations to be associated with the no-operation instruction such that the at least one reference to the address of the second program entity's object code segment in the second set of operations is replaced with the address of the no-operation operation, wherein the no-operation instruction has an address different from the first program entity's address; and
combining the updated one or more object code units into the executable program.

2. The computer-implemented method of claim 1, wherein the second set includes at least one operation that operates on the address of the second program entity before the update of the one or more object code units and operates on the address of the no-operation instruction after the update of the one or more object code units.

3. The computer-implemented method of claim 2, wherein the at least one operation from the second set is one selected from the group consisting of an address comparison and an address modification.

4. The computer-implemented method of claim 1, wherein the second set includes no operation that operates on the address of the second program entity.

5. The computer-implemented method of claim 1, wherein updating the one or more object code units further includes:
generating a first checksum using the first program entity's object code segment and a second checksum using the second program entity's object code segment; and
comparing the first checksum with the second checksum to determine whether the first program entity's object code segment is identical to the second program entity's object code segment.

6. The computer-implemented method of claim 5, wherein comparing the first checksum with the second checksum further includes:
generating a <key, value> pair in a hash table for the first program entity, wherein the key is the first program entity's checksum and the value is the first program entity's address;
querying the hash table for a value using the second checksum as a key; and
determining that:
the two program entities' object code segments are identical if the queried value is the first program entity's address; and
the two program entities' object code segments are different if the queried value is the second program entity's address.

7. The computer-implemented method of claim 1, wherein updating the one or more object code units further includes:
deleting the second program entity's object code segment from the executable program.

8. The computer-implemented method of claim 1, wherein each of the first and second program entities corresponds to one selected from the group consisting of a function and a read-only data member.

9. A system for optimizing an executable program, comprising:
one or more central processing units for executing programs; and
memory to store data and to store one or more programs to be executed by the one or more central processing units, the one or more programs including instructions for:
receiving one or more object code units associated with an executable program;
identifying, among the one or more object code units, a first program entity and a first set of operations associated with the first program entity and a second program entity and a second set of operations associated with the second program entity, wherein each program entity has an object code segment and an address of the object code segment and the first set of operations includes at least one reference to the address of the first program entity's object code segment and the second set of operations includes at least one reference to the address of the second program entity's object code segment;
when the first program entity's object code segment is identical to the second program entity's object code segment, updating the one or more object code units by generating and inserting a no-operation instruction in an address before the address of the first program entity's object code segment and causing the second set of operations to be associated with the no-operation instruction such that the at least one reference to the address of the second program entity's object code segment in the second set of operations is replaced with the address of the predefined operation, wherein the no-operation instruction has an address different from the first program entity's address; and
combining the updated one or more object code units into the executable program.

10. The system of claim 9, wherein the second set includes no operation that operates on the address of the second program entity.

11. The system of claim 9, wherein the instructions for updating the one or more object code units further include:
instructions for generating a first checksum using the first program entity's object code segment and a second checksum using the second program entity's object code segment; and
instructions for comparing the first checksum with the second checksum to determine whether the first program entity's object code segment is identical to the second program entity's object code segment.

12. The system of claim 9, wherein the instructions for updating the one or more object code units further include:
instructions for deleting the second program entity's object code segment from the executable program.

13. The system of claim 9, wherein each of the first and second program entities corresponds to one selected from the group consisting of a function and a read-only data member.

14. A non-transitory computer readable-storage medium storing one or more programs for execution by one or more processors of a respective server system, the one or more programs comprising instructions for:

receiving one or more object code units associated with an executable program;

identifying, among the one or more object code units, a first program entity and a first set of operations associated with the first program entity and a second program entity and a second set of operations associated with the second program entity, wherein each program entity has an object code segment and an address of the object code segment and the first set of operations includes at least one reference to the address of the first program entity's object code segment and the second set of operations includes at least one reference to the address of the second program entity's object code segment;

when the first program entity's object code segment is identical to the second program entity's object code segment, updating the one or more object code units by generating and inserting a no-operation instruction in an address before the address of the first program entity's object code segment and causing the second set of operations to be associated with the no-operation instruction such that the at least one reference to the address of the second program entity's object code segment in the second set of operations is replaced with the address of the predefined operation, wherein the no-operation instruction has an address different from the first program entity's address; and combining the updated one or more object code units into the executable program.

15. The non-transitory computer readable-storage medium of claim 14, wherein the second set includes no operation that operates on the address of the second program entity.

16. The non-transitory computer readable-storage medium of claim 14, wherein the instructions for updating the one or more object code units further include:

instructions for generating a first checksum using the first program entity's object code segment and a second checksum using the second program entity's object code segment; and instructions for comparing the first checksum with the second checksum to determine whether the first program entity's object code segment is identical to the second program entity's object code segment.

17. The non-transitory computer readable-storage medium of claim 14, wherein the instructions for updating the one or more object code units further include:

instructions for deleting the second program entity's object code segment from the executable program.

18. The non-transitory computer readable-storage medium of claim 14, wherein each of the first and second program entities corresponds to one selected from the group consisting of a function and a read-only data member.

\* \* \* \* \*